F. C. THOMAS.
INDEX SYSTEM.
APPLICATION FILED DEC. 31, 1907.

1,084,174.

Patented Jan. 13, 1914.

UNITED STATES PATENT OFFICE.

FLORIN C. THOMAS, OF WASHINGTON, PENNSYLVANIA.

INDEX SYSTEM.

1,084,174.  Specification of Letters Patent.   Patented Jan. 13, 1914.

Application filed December 31, 1907.  Serial No. 408,817.

*To all whom it may concern:*

Be it known that I, FLORIN C. THOMAS, a citizen of the United States, residing at Washington, in the county of Washington and State of Pennsylvania, have invented certain new and useful Improvements in Index Systems, of which the following is a specification.

My invention relates to index systems and is particularly adapted to indices for deed recording systems and to large accounts in which there is a reoccurrence of the same family or sur-name.

The object of my invention is to provide an index system in which it will be necessary to write the family or sur-name but once in the general index, thus effecting an immense saving in the labor of entering the names in the index.

A further object is to group all modifications of a well known name, or any variations in the spelling of that name as sub-captions, so that the examiner may immediately find the name without paying particular attention to the variations of spelling or modifications of the name.

A still further object is to group the names, both family and Christian names into parallel columns accordingly as they are of one, two, three or more syllables to facilitate the search for the name sought.

Another object is to group Christian names into parallel columns of male and female for the same purpose. Other objects will appear from the description of my invention.

From the foregoing it will be noted that my index system embraces two distinct divisions or indices, of which one is prepared after the contents of the others is complete or both may be prepared progressively; each division or index comprises a number of pages and may be included in one book, or a separate book may be appropriated to the contents of each. In connection with the drawings it will be understood that one of the indices contains the various particulars and entries to which an inquiry may be directed while the other contains a list of names referring to the proper place in the first-named index where the particulars may be found under that name. For convenience in nomenclature, I will designate the first index the "primary index" and the second index as the "key" index. For convenience of illustration the principle of my index system can be embodied in a specimen page of each separate index since the various pages in each index conform to a similarly utilized principle.

As I will describe my novel index as applied particularly to deed recording indices, it will be apparent that it is also applicable to many other similar uses such as indices to large accounts, etc.

In the accompanying drawings, which form part of these specifications, Figure 1 represents a fragment of a page from the key index, which may for convenience be bound in book form, and in the drawing shows the entries under the initial letter "S". Fig. 2 is a portion of a page in the primary index, which we will assume to be bound in book form also. The page represented being for the sake of convenience assumed as page 21 containing the group or family name "Smith" and its modifications. Fig. 3 is a similar representation of a page from the primary index but shows a modified form in which the Christian names are not divided into groups according to syllables, but only according to sex.

Referring again to the drawings for a detail description of my invention, $(a)$ represents a page or a portion of a page from the key index. Each page of this index is divided primarily into a plurality of columns. In the drawing I show for convenience three such columns, lettered respectively $b$, $c$, $d$. These columns are designed to contain family names as shown by the entries $e^1$, $e^2$, $e^3$. In the first column or column $f^1$ may be inserted family names of one syllable. In the second column or column $c$ may be inserted family names of two syllables, in the third column or column $d$ may be inserted family names of three or more syllables, each of these columns have a suitable caption indicating the group of family names to be entered therein as shown at $f^1$, $f^2$, and $f^3$. It will be apparent that this division of the names may be varied without departing from the essence of my invention; that is, two or more columns may be used. I also provide vertical columns $g^1$, $g^2$, $g^3$ adjacent to the aforesaid group columns for the purpose of consecutively numbering the names entered in the adjacent group columns, but these columns $g^1$, $g^2$ and $g^3$ may be dispensed with if desired. Following each of the groups columns are parallel vertical columns $h^1$, $h^2$ and $h^3$ having a caption "group page" or some similar caption to indicate that in these columns should be entered the reference to the page in the general index, which will be hereinafter described. Additional columns may be inserted without departing from my invention.

In Fig. 2 is shown a portion of a page from my primary index. For the convenience of a subsequent illustration of the working of my index I have assumed that the page shown in Fig. 2 is page 21 embracing the family name or group Smith. This page of which the other pages in the said general index are duplicates or counterparts with the exception of the names to be entered therein, is provided with a horizontal caption space in which the name of the family or group may be entered as shown by the reference letter "$i$". In said caption space is also provided a plurality of lines indicated by the reference letters $k$—$k$. The purpose of these lines is to provide spaces in which may be inserted any modifications of the family or group name, for example, as in the drawing, the family or group name is represented as "Smith". And in the spaces $k$—$k$ may be placed the spelling modifications or variations in the spelling of said name "Smith", for example Smyth, Schmidt, etc., each of these modified spellings being preceded by a reference numeral or other means of identification, the purpose of which will be hereinafter shown. I also provide a plurality of vertical columns $m^1$, $m^2$, $m^3$. These columns are designed to, and are provided with appropriate arbitrary designations to indicate that therein shall be entered, in separate columns, Christian names of one, two, three or more syllables; and similar columns $l^1$, $l^2$ and $l^3$ may be provided, and when provided there are two groups of such vertical columns, one designed for male names and the other for female names. The columns in the male group are designated in a suitable manner, as by the use of the term "Male", and, likewise, the group appropriated for female names. The indications for one, two and three syllable names are shown in the drawing as consisting of the numerals 1, 2, and 3, conveying the information that one syllable names shall be written in the column designated by the numeral 1, two syllable names in the column designated by the numeral 2, and names of three or more syllables in the column designated by the numeral 3. Preceding and parallel with these columns is placed a column "$o$", the purpose of which is to provide space for the entry of the reference numerals or other means of designation of the modified forms or variations in spelling of the group name. Another parallel column and adjacent to the column "$o$" may be provided with suitable caption in which the date of record may be inserted. Adjacent to the aforesaid columns may be provided such other columns as may be adapted to the work which the index is required to perform. In the drawing I have assumed that the index is being used with reference to a deed registry and, therefore, show as additional columns the grantee column "$q$", the entry column "$r$", the book and page columns "$s$ and $t$," the date columns "$u$, $v$ and $w$", the date of record columns "$x$, $y$ and $z$", and the location column $a$ $a$.

In Fig. 3 I show a modification of a primary index page shown in Fig. 2. In this modification I have arranged the division of the Christian names into groups according to syllables and show the grouping of said Christian names only according to sex as in the columns $l$ and $m$.

The practical operation of my index system will best appear from an illustration and a hypothetical case. Suppose we have a deed from John and Mary Smith to John Jones for record. Take the S book turn to the separate key index situated preferably in the left hand column; as Smith is a name of one syllable, look in column $l$ in which names of 1 syllable are placed; readily find the name Smith with a page given to primary index on which all Smiths will be grouped; if the name Smith does not occur, write Smith in said column, giving it a page in the primary index; write the family name Smith at the top in center of page (this is the only time the family name is written) write the Christian name John in the one syllable column under the division men or male and on the same line in the two syllable column under the division women or female, write the Christian name Mary; write John Jones in the division under grantee, and the date desired following on the same line making a complete record of said conveyance in 1 line space and all other conveyances following as the above in chronological order.

Supposing the next instrument for record is Robert Smythe and Jane his wife to Samuel Anderson: Search the 1 syllable column key index until you find Smith, to the right and on the same line write Smythe and then take the group page already given to Smith in general index. On the first short or added line at the top of page (which is numbered 1) write the word Smythe (this variation is only written once) and in the column preferably to the extreme left of the page write the figure 1 on the line in which the record is to be made (this figure 1 denotes by referring back to the corresponding figure at the top of the page, that the owner of the Christian name following on this line spelled the family name Smythe) write the Christian name Robert on the line below the preceding entry under the division of men or male and on the same line in the one syllable column under the division women or female write the Christian name Jane; write Samuel Anderson in the division under grantee, and the date desired following on same line.

In a conveyance like J. H. Smith. Find group as before and under the division men or male, in each of the 1—2—3 syllable columns write J. H.—because we do not know the name for which J. stands. All other variations and following conveyances are treated as above.

It will, therefore, appear that by writing the family name only once, and at top of page unnecessary work is saved. Example: If 500 Smiths make deeds, you write it once and save the time of writing it 499 times.

To further show the facility which my index affords it will be seen that by indexing every person having the same family name in one group as adapted to deeds and mortgages, power of attorney, judgments, etc., it is not necessary in making a search to know the Christian name or given name of maker or the one to whom made. Example: You know Smith made a deed to Jones—simply look in indicator index column in which only names of one syllable are found until you find the family name Smith—opposite which will be the page number in the primary index on which all Smiths are grouped, look down the grantee column in this group until you find the name Jones—the data on that line or a reading of the deed referred to by book and page will inform you whether it is the deed desired.

Another feature is that no definite arrangement, no allotment of space is necessary in the primary index. It is expansive as long as there is a line in the book.

Every name found in the key index will be given a page and a group started in which will be indexed all Christian names with the data for same as the same are filed for record. Therefore, there will be as many groups in the primary index as there are family names in the key index.

In making a search by this method of indexing, inasmuch as all the Christian names are grouped together under one family name it becomes possible and easy to search two or more Christian names at the same time and in one search through the group; this is a unique feature and not possible in any other system except where Christian names have same initial letter.

For the facilitating of paging up of current work after having been transcribed and also for checking up same I have inserted a column in which is written the entry number or a consecutive number placed on the document as it is filed for record.

Upon opening book at the group in which document is recorded, we insert the book and page of the record of the document in their respective columns in the index following the number in the entry number column which number in said column corresponds to the entry or consecutive number of the document; thus checking up work and completing the record.

This index can also be adapted to two or more letters in a book as easily as one, generally all names where family name begins with same letter are bound in one book; for example, all family names beginning with A are put in one binding and called the A book, etc., but any number of letters or the whole alphabet can be put in one book by making suitable key index space for same, i. e. three syllable columns for the A's (all family names beginning with A), three for the B's, etc.

In the appended claims I have employed two terms to which I attach the following meanings, it being understood that these terms have the same meanings wherever used in any of the claims. By "key index" I designate the index shown in Fig. 1 of the drawings which index is designed, as stated, to enable the user readily to ascertain what surnames are to be found in the index shown in Figs. 2 and 3. The index shown in Figs. 2 and 3, I designate a "primary index" since in it there may be found every Christian name thereunto belonging or appertaining. The designation of "primary index" and "key-index" will be borne in mind, therefore, as indicating that the first is prepared as a result of the second, since each surname in the first takes the number of page corresponding thereto in the second.

Having thus fully described my invention, I claim as new and desire to protect by Letters Patent of the United States:

1. A device of the character described, comprising, in combination, a primary index and a key index therefor, each index composed of numbered pages, a series of syllabically-arranged and numbered surnames inscribed on each page of said key index, each page of said primary index being devoted to one or more of said surnames, the number of which in said key index is the number of such page, a series of alined and numbered names of varied spelling for each surname entered in the primary index inscribed at the upper end of each page thereof, each page of said primary index having a series of spaced transverse lines, Christian names relating to each surname being inscribed thereupon and classified according to sex and the number of syllables therein, each line being divided into parts of which a separate part is appropriated to each disposition, and an additional part to the number of the diversely-spelled name corresponding to the surname to which a Christian name relates.

2. A device of the character described, comprising, in combination, a primary index and a key index therefor, each index composed of numbered pages, a series of syllabically-arranged and numbered surnames inscribed on each page of said key index, each page of said primary index being devoted to one or more of said surnames, the number of which in said key index is the number of such page, each page of said primary index having a series of spaced transverse lines, Christian names relating to each surname being inscribed thereupon and classified according to sex and the number of syllables therein, each line being divided into parts of which a separate part is appropriated to each disposition.

3. A device of the character described, comprising, in combination, a primary index and a key index therefor, each index composed of numbered pages, a series of syllabically-arranged and numbered surnames inscribed on each page of said key index, each page of said primary index being devoted to one or more of said surnames, the number of which in said key index is the number of such page, each page of said primary index having a series of spaced transverse lines, Christian names relating to each surname being inscribed thereupon and classified according to sex and the number of syllables therein, each line being divided into parts of which a separate part is appropriated to said disposition, and a common border over each separate part for designating said disposition.

4. A device of the character described, comprising, in combination, a primary index and a key index therefor, each index composed of numbered pages, a series of syllabically-arranged and numbered surnames inscribed on each page of said key index, each page of said primary index being devoted to one or more of said surnames, the number of which in said key index is the number of such page, each page of said primary index having a series of spaced transverse lines, Christian names relating to each surname being inscribed thereupon and classified according to the number of syllables therein, each line being divided into parts of which a separate part is appropriated to said disposition, and a common border over each separate part for designating said disposition.

5. A device of the character described comprising, in combination, a primary index and a key index therefor, each index composed of numbered pages, a series of syllabically-arranged and numbered surnames inscribed on each page of said key index, each page of said primary index being devoted to one or more of said surnames the number of which in said key index is the number of such page, a series of alined and numbered names of varied spelling for each surname entered in the primary index inscribed at the upper end of each page thereof, each page of said primary index having a series of spaced transverse lines, Christian names relating to each surname being inscribed thereupon and classified according to sex and the number of syllables therein, each line being divided into parts of which a separate part is appropriated to said disposition and an additional part to the number of the diversely-spelled name corresponding to the surname to which a Christian name relates, and a common border over the separate parts for designating said disposition.

6. A device of the character described, comprising, in combination, a primary index and a key index therefor, each index composed of numbered pages, a series of syllabically-arranged and numbered surnames inscribed on each page of said key index, each page of said primary index being devoted to one or more of said surnames the number of which in said key index is the number of such page, a series of alined and numbered names of varied spelling for each surname entered in the primary index inscribed at the upper end of each page thereof, each page of said primary index having a series of spaced transverse lines, Christian names relating to each surname being inscribed thereupon and classified according to the number of syllables therein, each line being divided into parts of which a separate part is appropriated to said disposition and an additional part to the number of the diversely-spelled name corresponding to the surname to which a Christian name relates, and a common border over the separate parts for designating said disposition.

7. A device of the character described, comprising, in combination, a primary index and a key index therefor, each index composed of numbered pages, a series of syllabically-arranged and numbered surnames inscribed on each page of said key index, each page of said primary index being devoted to one or more of said surnames, the number of which in said key index is the number of such page, each page of said primary index having a series of spaced transverse lines, Christian names relating to each surname being inscribed thereupon and disposed according to sex, each line being divided into parts of which a separate part is appropriated to said disposition and said disposition syllabically separating each Christian name, and a border common to each separate part of a line for designating said disposition by sex and syllable.

8. A device of the character described comprising, in combination, a primary index and a key index therefor, each index composed of numbered pages, a series of syllabically-arranged and numbered surnames inscribed on each page of said key index, each page of said primary index being devoted to one or more of said surnames the number of which in said key index is the number of such page, a series of alined names of varied spelling for each surname entered in the primary index inscribed at the upper end of each page thereof, each page of said primary index having a series of spaced transverse lines, an inscription on each line comprising Christian names to each surname entered and additional independent matters of record, said Christian names being disposed according to sex, each line being divided into parts, of which a separate part is appropriated to said disposition and the disposition syllabically separating each Christian name, and separate parts to said independent matters, and collinear inscriptions entered adjacent said Christian names coöperating with said series of varied spelled names to point out the surname equivalents of said Christian names.

9. In a device of the kind described, an index comprising separate numbered pages, each page having a plurality of inscribed vertical columns surmounted by a border, a family name and a designated series of alined and numbered names indicating each a diversely-spelled equivalent for said family name both separately inscribed within said border, a plurality of properly designated vertical columns in each of which a series of Christian names corresponding to said family name is classified according to sex and the number of syllables therein, and an additional column in which is entered opposite both sex-divided Christian names the numbers corresponding to their diversely-spelled but similarly numbered surname equivalents.

10. In a device of the kind described an index comprising separate pages, each page having a plurality of inscribed vertical columns surmounted by a border, a family name and a designated series of alined and numbered names indicating each a diversely-spelled equivalent for said family name both separately inscribed within said border, a plurality of properly designated vertical columns in each of which a series of Christian names corresponding to said family name is classified according to the number of syllables therein, and an additional column in which is entered opposite said Christian names the number corresponding to their diversely-spelled but similarly numbered surname equivalents.

11. In a device of the kind described an index comprising separate pages, each page having an inscribed vertical column, intersected by spaced transverse lines and surmounted by a border, a family name and a group of diversely-spelled equivalents therefor, both separately inscribed within said border, said vertical column being divided into two designated parts whereby there may be entered in each part a series of Christian names according to sex, each of said parts having designated divisions whereby there may be classified in each division said series of Christian names according to the number of syllables therein, and collinear inscriptions adjacent said Christian names coöperating with said group of diversely-spelled names adapted to point out the surname equivalents of said Christian names.

12. A device of the character described comprising a primary index and a key-index therefor, each composed of numbered pages, a plurality of columns intersected by spaced transverse lines inscribed on each page of said key index, a designated series of syllabically disposed and numbered surnames, inscribed in said columns on said lines, a plurality of columns intersected by spaced transverse lines inscribed on each page of said primary index and surmounted by a common border, each page of said primary index devoted to one or more of said surnames the number of which in said key index is the number of such page, the surname thus entered being inscribed within said border, a designated group of numbered names of varied spelling inscribed adjacent said surname in said border indicating equivalents thereof, a column of said primary index being divided into two designated parts and these parts into designated divisions, the former being for a sex-divided and the latter for a syllable-divided Christian name, and Christian names, numbered to correspond to a diversely-spelled surname, if necessary, inscribed on lines in the proper part and division.

In testimony whereof I have affixed my signature in presence of two witnesses.

FLORIN C. THOMAS.

Witnesses:
A. H. KAUFMAN,
FRANK FIX.

---

Copies of this patent may be obtained for five cents each, by addressing the "Commissioner of Patents, Washington, D. C."